United States Patent [19]

Downes et al.

[11] Patent Number: 5,036,514
[45] Date of Patent: Jul. 30, 1991

[54] APPARATUS AND METHOD FOR ISOLATING AND PREDICTING ERRORS IN A LOCAL AREA NETWORK

[75] Inventors: Robert W. Downes, Raleigh; Wilson E. Smith, Bahama; Ronald E. Suciu; Kenneth T. Wilson, both of Raleigh, all of N.C.

[73] Assignee: International Business Machines Corp., Armonk, N.Y.

[21] Appl. No.: 433,930

[22] Filed: Nov. 9, 1989

[51] Int. Cl.[5] .................. H04L 12/26; H04J 3/14; G06F 11/34
[52] U.S. Cl. .................... 371/51; 364/200; 364/264.1; 371/29.1
[58] Field of Search ............ 371/5.1, 5.5, 11.2, 371/20.1, 20.2, 20.6, 4, 29.1; 364/200 MS File

[56] References Cited

U.S. PATENT DOCUMENTS 4,769,761 9/1988 Downes et al. .................. 364/514

Primary Examiner—Stephen M. Baker
Attorney, Agent, or Firm—John B. Frisone

[57] ABSTRACT

A method for correcting error weights in a communication system in which at least one error condition can result from more than one cause. Stations on the system send error reports to an error monitor station which maintains a count of the number of stations reporting an error having multiple causes and periodically corrects the error weights assigned to each station as a function of the maximum number of errors reported by any station only when the number of stations reporting a multiple cause error exceeds a predetermined value.

7 Claims, 7 Drawing Sheets

APPARATUS AND METHOD FOR ISOLATING AND PREDICTING ERRORS IN A LOCAL AREA NETWORK

BACKGROUND OF THE INVENTION

1. Field of the Invention

The invention relates to data communication systems in general and more particularly to a failure isolation and prediction technique which can distinguish between two or more different causes for a common failure indication and compensate a failure indication count as a function of the event or events which cause the common failure indication.

2. Prior Art

U.S. Pat. No. 4,769,761 issued Sept. 6, 1988 and assigned to the same assignee of this application, discloses an isolating and predicting system and method for use with local area network data communications. The patented system and method has been used in token ring communication networks conforming to the IEEE 802.5 standard operating at $4 \times 10^6$ bits per second data rates with great success. However, when bit rates were increased to $16 \times 10^6$ bits per second, a significant increase in reported burst errors occurred.

The increase in reported burst errors was analyzed and it was determined that the increased burst errors reported resulted from normal station insertions and not from station failures. Since the burst errors attributable to normal station insertions do not represent a network failure, it became incumbent to distinguish and compensate for burst error indications attributable to station insertions in the error reporting system.

Unfortunately, the burst error detection process at the stations could not readily discriminate between burst errors caused by a station failure and those caused by station insertion; therefore, burst error indications received at the Ring Error Monitor (REM) include burst errors caused by both station insertion and station failures. If all burst errors are counted, the results obtained are invalid.

SUMMARY OF THE INVENTION

The invention contemplates a method for use in a communication network in which the same error condition can result from at least two different causes, at least one of which is not related to a system failure. According to the method, the error condition, regardless of cause, is detected by the stations on the network and reported via the network to an error monitor station connected to the network. The error monitor station during each of successive time periods receives the error reports related to the error condition having multiple causes, at least one of which is not related to a system failure. The error monitor station stores (1) the received information relative to the error condition after it has been limited and weighted (2), the number of stations reporting the error condition within the time period and (3) the maximum number of errors reported by any station. The monitor station during each time period compares selected stored data to predefined limits and modifies the stored error condition reported by the stations as a function of the said comparisons.

The invention contemplated herein provides an improved mode of operation for the system and method disclosed in the aforementioned U.S. Pat. No. 4,769,761 the entire content of which is incorporated herein by reference. The improvement resides in providing for the discrimination between different causes for a common error condition and modification of the accumulated error condition as a function of the specific cause for the error condition.

DESCRIPTION OF THE PREFERRED EMBODIMENT

As described in the '761 patent, error reports covering a number of different errors (see FIG. 7 of '761) are prepared by the stations on the network and sent to one or more stations which act as Ring Error Monitors (REM) each of which includes a REM program fro processing the messages reporting errors. One of the error conditions reported by the stations to REM (Burst Error) can be produced by different causes.

Where one of the causes is not the result of a system failure, it becomes necessary to determine the cause of the error condition. When token ring bit rates are increased from $4 \times 10^6$ bits per second to $16 \times 10^6$ bits per second, Burst Errors resulting from station insertions increase dramatically. These Burst Errors are created by normal network operations and are in addition to Burst Errors resulting from improper operation or equipment failure.

Individual stations detecting Burst Errors have no available information which would permit then to identify and report the specific cause of the detected Burst Errors. Thus, Burst Error reports prepared by the detecting stations include detected Burst Errors from all causes including Burst Errors resulting from station insertions.

Figure 1:
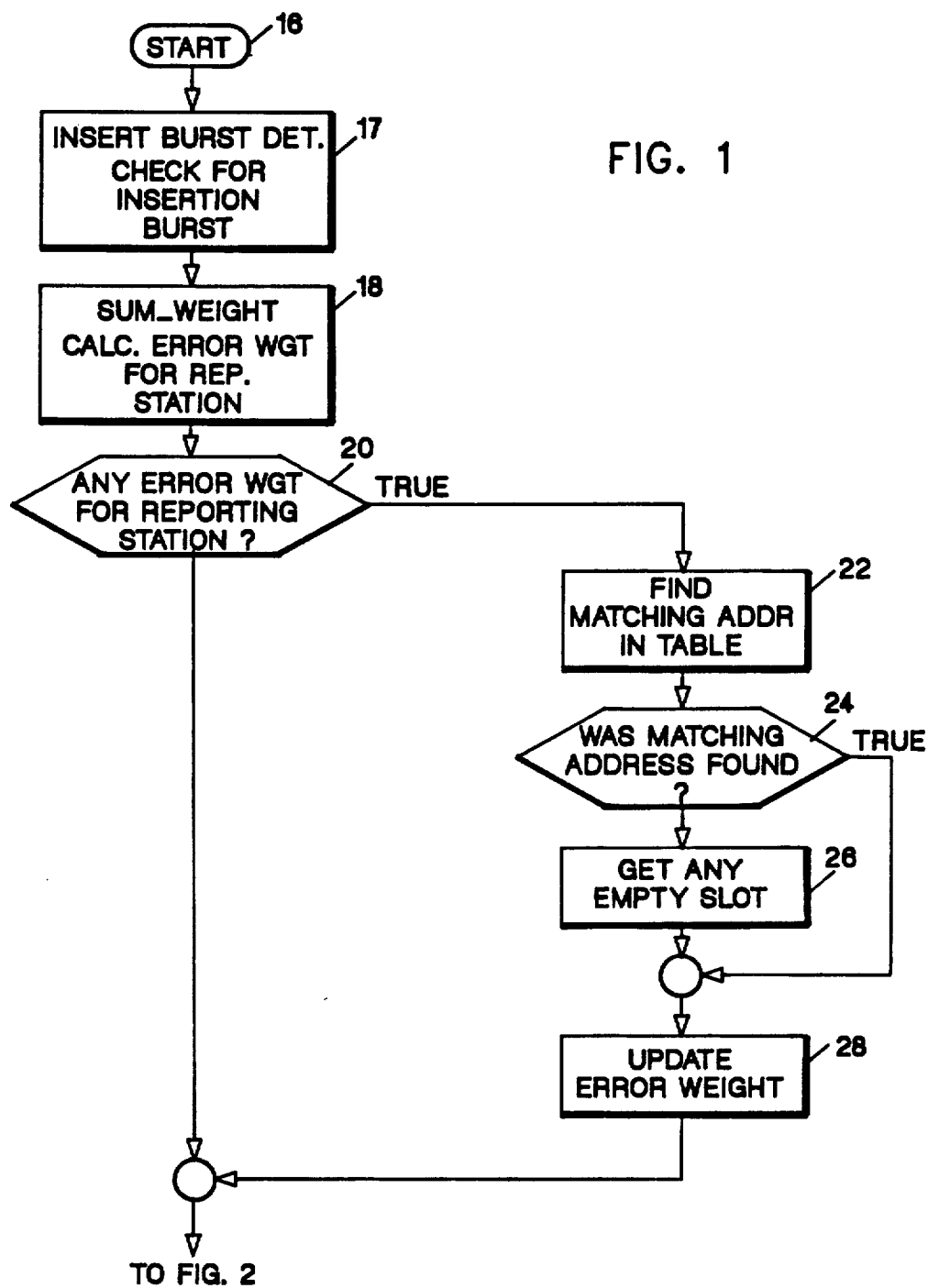
FIGS. 1, 2 and 3 are flowcharts illustrating the general operation of the invention. They correspond to FIGS. 5A, 5B and 5C, respectively, in the aforementioned '761 and include the modifications required to implement the added function.
Figure 2:
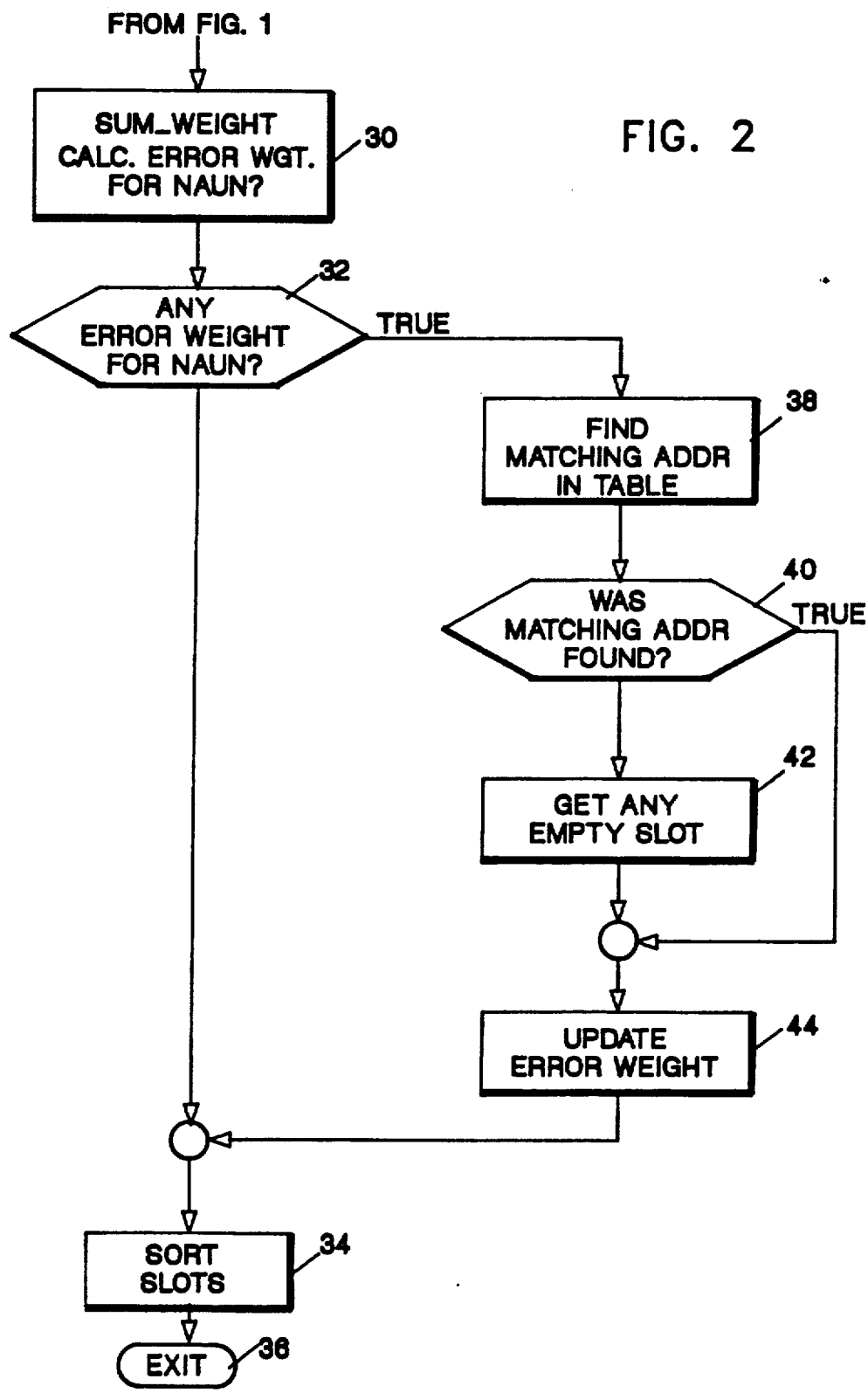
Figure 3:
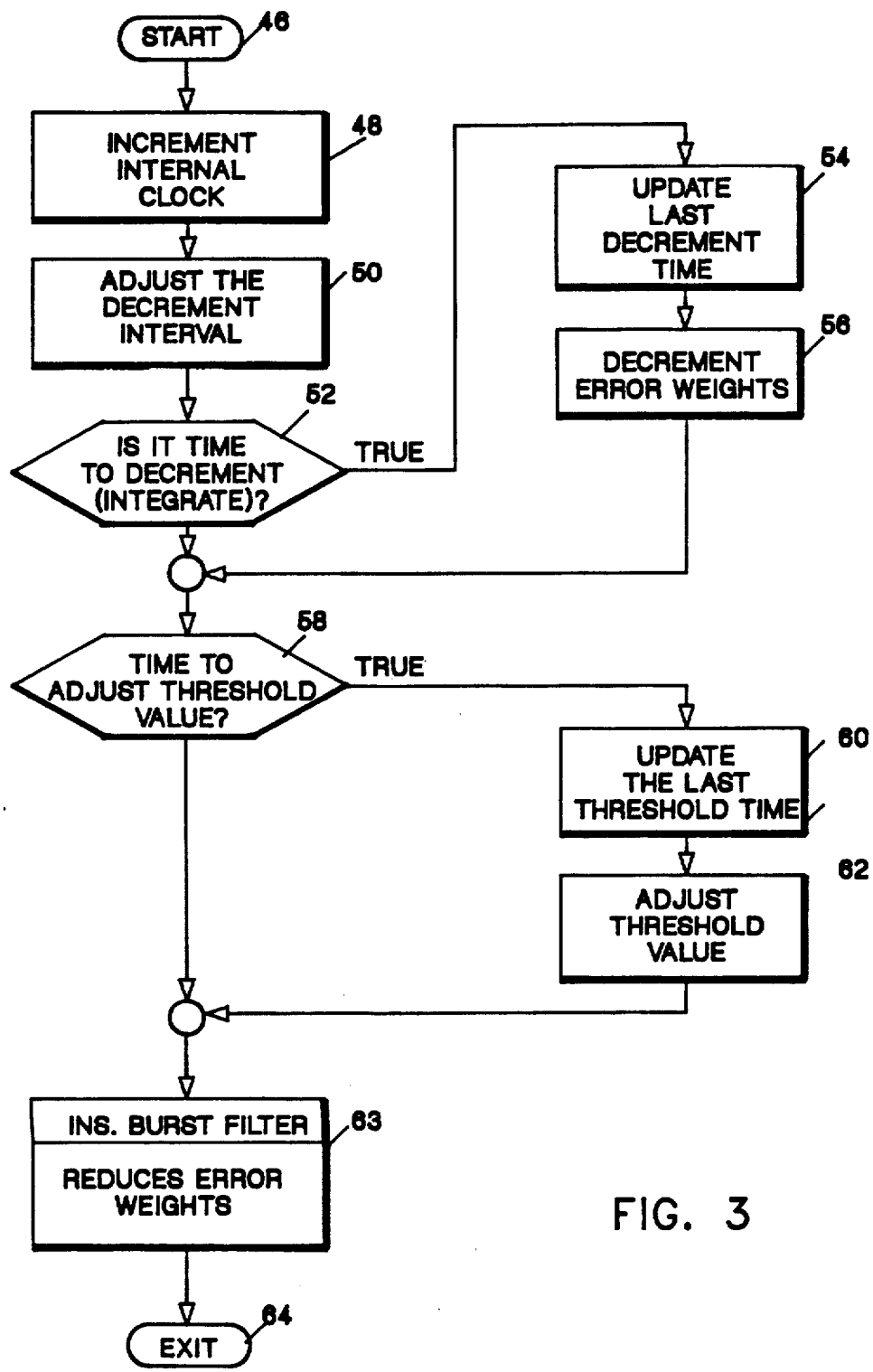

The flow diagrams illustrated in FIGS. 1, 2 and 3 are similar in many respects to the flow diagrams illustrated in FIGS. 5A, 5B and 5C of the '761 patent. They have, however, been modified according to the invention to allow REM to detect the cause of any reported Burst Errors and compensate or correct the reported information concerning Burst Errors as a function of the cause as determined by REM.

In FIG. 1 the program enters at block 16 upon the receipt of an error report from a station. As described in the '761 patent, the processing described below occurs upon the receipt of an error report.

Block 17, insert burst detector, is a new function provided. In this block a counter "Insert_Burst_Counter" is incremented up to some predetermined value upon the receipt of reports which include Burst Errors. How this function is implemented will be described in greater detail in connection with the description of FIG. 1A.

In block 18 of FIG. 1 the error weight for each type of error is calculated. In addition, Burst Error reports are subjected to a pre-filtering operation prior to the calculation of a weighted sum. How these functions are implemented will be described in greater detail in connection with the descriptions of FIGS. 1B and 1C.

The remainder of the process illustrated in the flow diagram of FIG. 1 is identical to that illustrated in FIG. 5A of the '761 patent and described therein. In block 22 a report including an error weight for a report station is checked to see if the address is in the table. If a matching address is found in the table, the error weight stored therein is updated in 28. If no matching address is found, an empty slot in the table is selected in 26 and the zeroed values are updated in 28.

The flow diagram of FIG. 2 is substantially identical to FIG. 1 with two exceptions. The functions performed in FIG. 2 are related to the next active upstream neighbor (NAUN) station error weights as opposed to a reporting station error weights as in FIG. 1. In addition the slots in the table are sorted as described in the '761 patent in block 34 and the program exits in block 36.

Figure 1A:
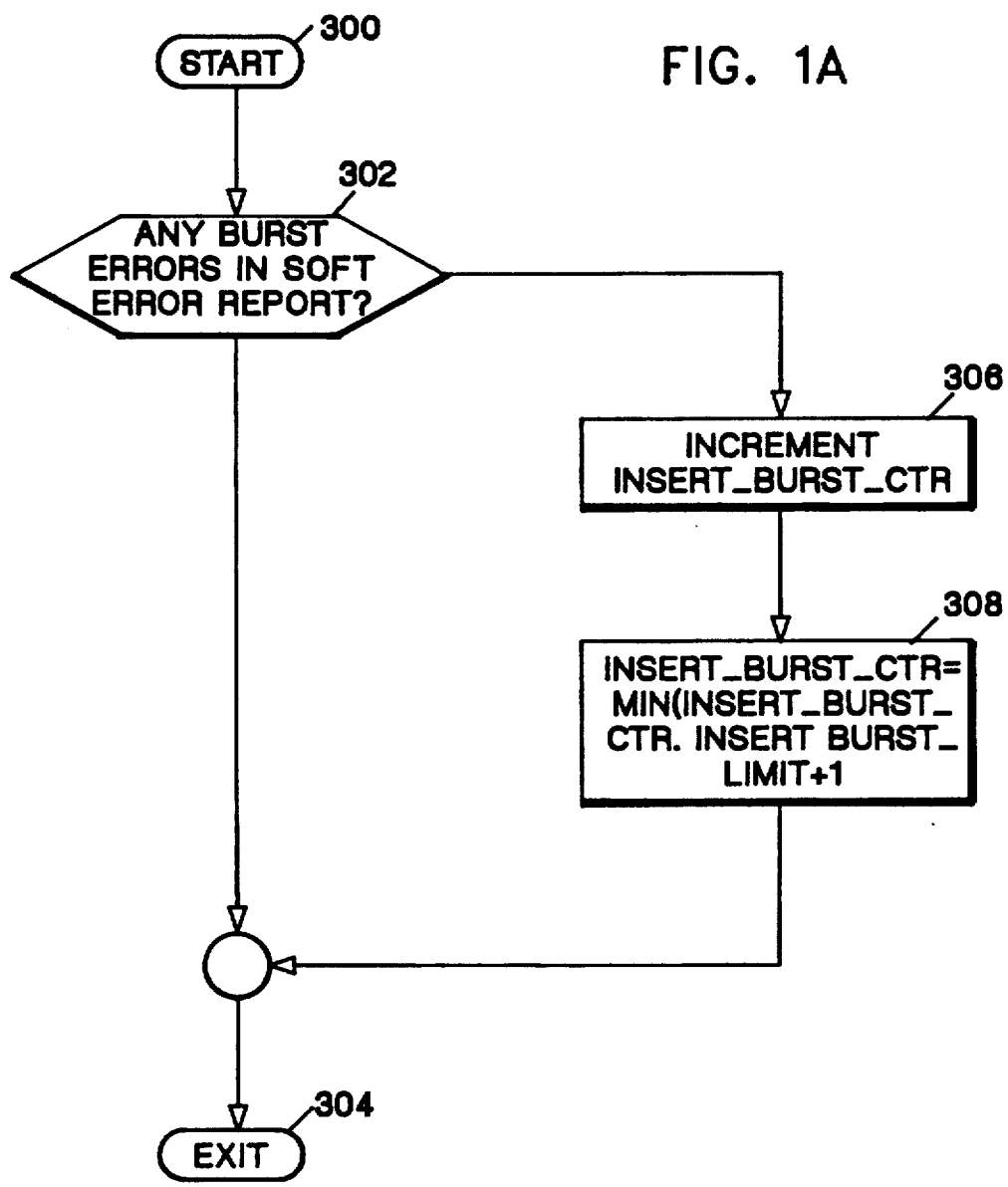
FIGS. 1A, 1B and 1C illustrate in greater detail new elements set forth in FIG. 1.

The details of the insert burst detection 17 of FIG. 1 are illustrated in FIG. 1A. This routine is entered at block 300. In block 302 the error report is examined to determine if it includes a Burst Error. If no burst errors are reported, the routine exits at 304. If the report includes any Burst Errors, and Insert_Burst_Counter is incremented by one. Thus, during the time period a count is maintained of the number of stations reporting Burst Errors. This count is limited in block 308 to maximum preset value called Inser_Burst_Limit+1. After the Insert_Burst_Counter is updated, the routine exits.

Figure 1B:
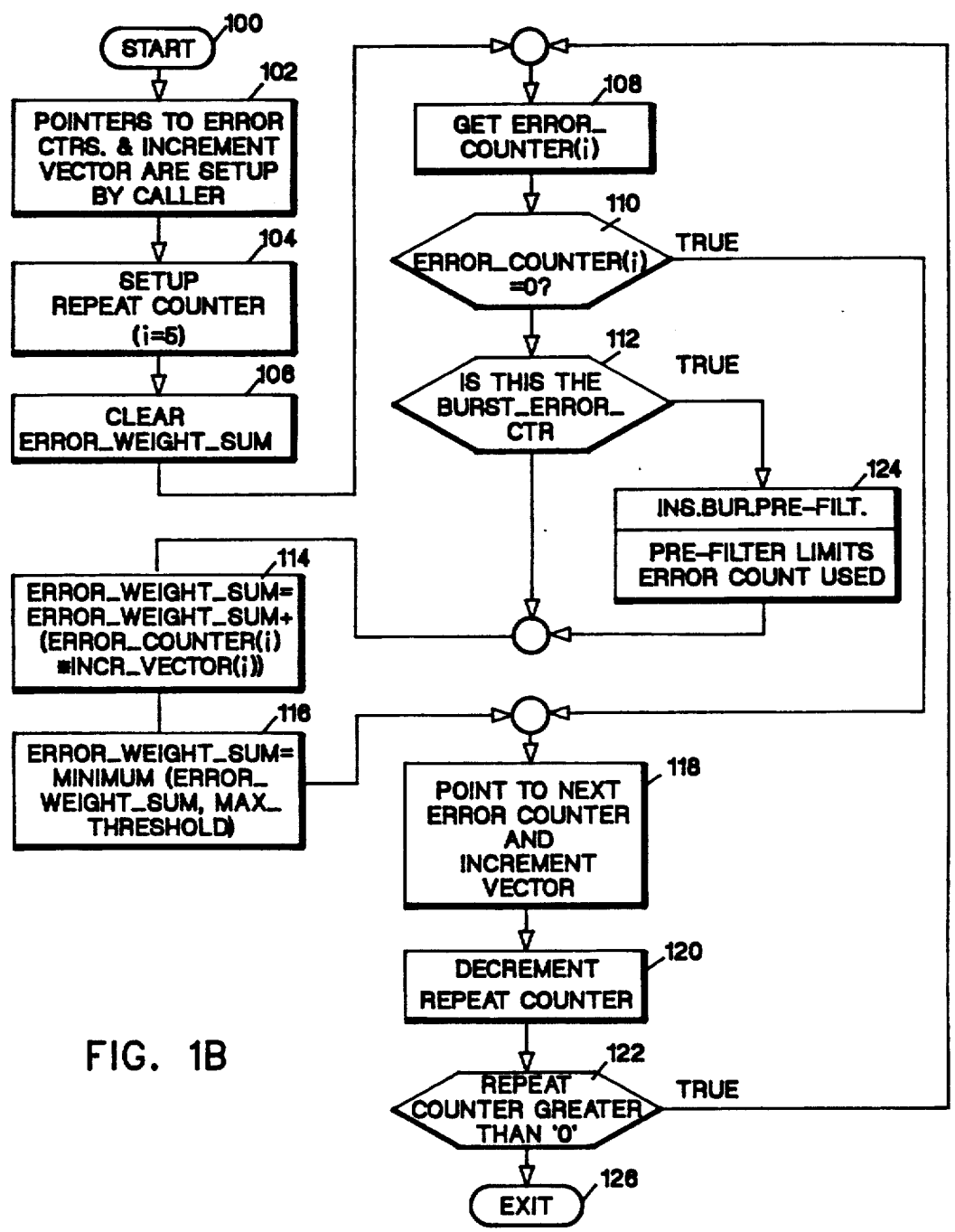

A detailed flow diagram of the SUM_Weight subroutine 18 is illustrated in FIG. 1B. Each error report includes a count of each of the recognized error types. The different error types are described in the '761 patent and are listed in FIG. 7 of that patent. In addition to Burst Errors, the list includes Line, Internal, ARI/FCI and Abort Transmsit Errors.

The illustrated sub-routine accumulates Error_Weight_Sum for the errors in each report. However, the contribution of Burst Errors as opposed to the other error types is modified by a pre-filtering operation. The sub-routine starts in block 100. In block 102 the caller sets up pointers to the error counters and to the appropriate increment vector (which in the described embodiment includes five scalar factors, see FIG. 7 of '761 patent). In block 104 a repeat counter is set to five which corresponds to the number of error types.

In block 106 the Error_Weight_Sum accumulator is reset in preparation for the calculation of the Error_Weight_Sum for the report being processed. The remainder of FIG. 1B represents a loop which is executed at least in part, i times where in the illustrated embodiment i=5.

In turn and under control of the pointer (102) each of the error counts is accessed by block 108. In block 110 the count is checked to see if it is zero. If it is zero, no further processing takes place and the next error count is accessed after the pointers are adjusted in blocks 118 and 120. Block 122 checks to see if all error counts (i=0) have been processed. If they have, the sub-routine exits at 126.

If the count is not zero (110), block 112 checks to see if the error count in process is a burst error. If a burst error is being processed, it is applied to a pre-filtering operation in block 124. This operation will be described in greater detail in connection with the description of FIG. 1C. Pre-filtered burst errors and all other errors are applied to an Error_Weight_Sum block 114 which accumulates an Error_Weight_Sum for the report being processed. This is equal to the previously accumulated Error_Weight_Sum (for the first error [value i=5] being processed the Error_Weight_Sum is zero since the accumulator as cleared in block 106) plus (+) the value of error count i times (*) the increment vector i. In block 116 the Error_Weight_Sum is limited to a Maximum_Threshold value so as not to overrun allocated storage. The remainder of the process (118,120, 122 and 126) is as described above.

Figure 1C:
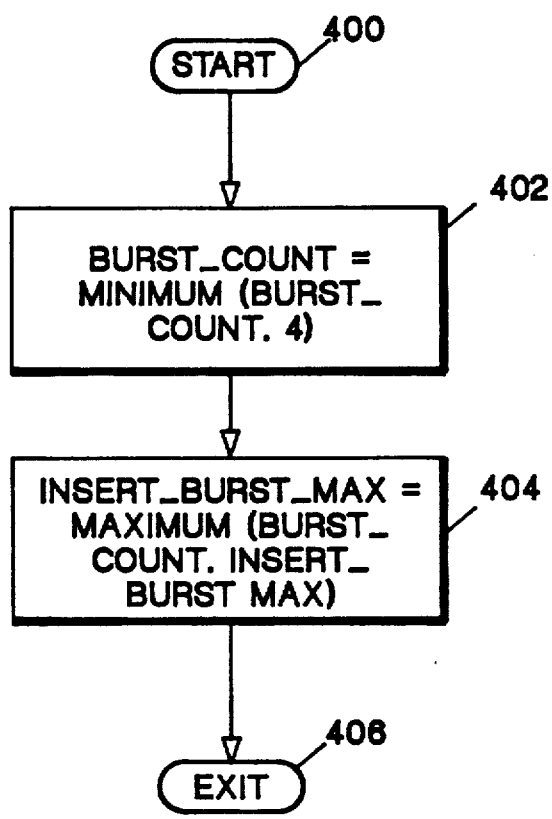

The insert burst pre-filter operation is illustrated in FIG. 1C. The routine starts in block 400 and in block 402 the reported Burst_Count is limited to the minimum of the reported Burst_Count or a constant (set to 4 in the described embodiment). In block 404 a value Insert_Burst_Max is updated. Insert_Burst_Max is the largest number of Burst Errors reported by any station during the current time period. The routine exits in block 406.

FIG. 2 is similar to FIG. 1 and in blocks 30, 32, 38, 40, 42 and 44 performs the same function for error weights for a NAUN station as performed for a reporting station by blocks 18, 20, 22, 24, 26 and 28, respectively, in FIG. 1. Block 34 sorts the slots by magnitude after the error weights (blocks 28 and 44) are updated.

Except for the addition of an Insert Burst Filter 63 prior to the EXIT 64 FIG. 3 is identical in structure and function to the routine illustrated in FIG. 5C of '761 patent. In the illustrated routine (FIG. 3) the internal clock is incremented (48), the decrement interval is adjusted (50), the last decrement time is updated (52, 54) and the error weights are decremented (56). Thereafter, the last threshold time is updated (58, 60) and the threshold value adjusted (62).

Figure 3A:
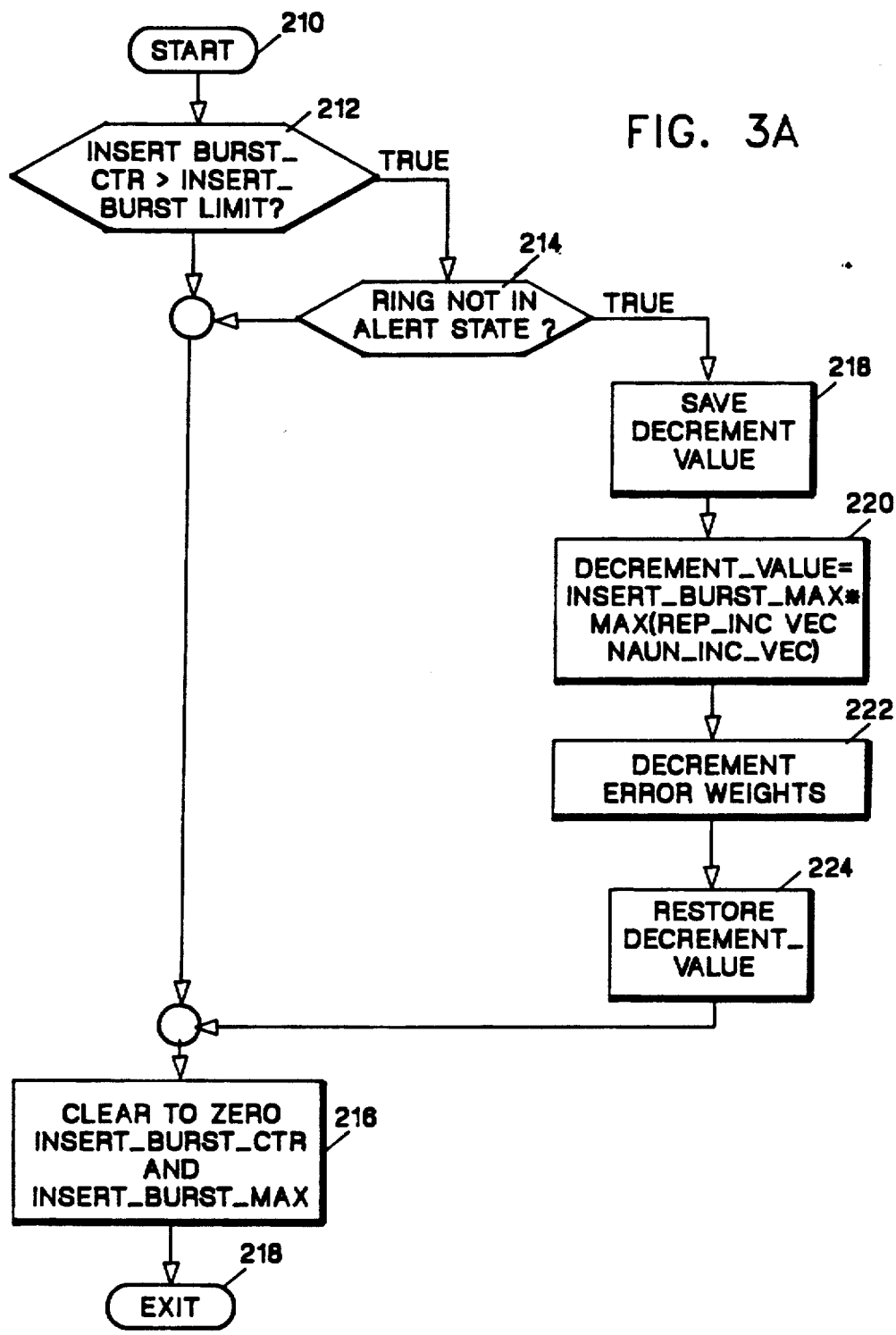
FIG. 3A illustrates in greater detail a new element set forth in FIG. 3.

FIG. 3A is a detailed illustration of the Insert Burst Filter (63) of FIG. 3. The Insert Burst Filter routine starts in block 210 of FIG. 3A. In block 212 the Insert_Burst_Counter (FIG. 1A) is compared to the Insert_Burst_Limit. If the counter value is less than the limit, the routine goes to block 216 where the Insert_Burst_Counter and the Insert_Burst_Max are both cleared to zero. In this instance, the burst errors are deemed to be the results of a system failure and not the result of station insertion; therefore, the current error weights are retained as indicative of system operation.

On the other hand, if the Insert_Burst_Counter exceeds the Insert_Burst_Limit, the burst errors are deemed to have resulted from station insertions and the current error weights for burst errors must be modified in order to properly reflect system failure.

In block 214 the correction is entered only when the ring is NOT in the alert state. The alert state exists when a defective ring segment has been identified. The routine descends to block 218 in which the normal decrement value is saved. In block 220, a burst error Decrement_Value is derived. The value equals Insert_Burst_Max (404 FIG. 1C) times (*) MAX (Rep_Inc_Vec or NAUN_Inc_Vec). In block 222 (same function as block 56 FIG. 3) the slot error weights are adjusted to accosunt for burst errors resulting from station insertions. The normal decrement value is restored in block 224. The routine then enters block 216 and 218 as described above where the Insert_Burst_Counter was less than the Insert_Burst_Limit.

While the invention has described with respect to a specific embodiment, it will be obvious to those skilled in this art that changes in both form and/or detail may be made without a departure from the scope and/or spirit of the invention.

We claim:

1. In a communication network including a plurality of data terminals, each of which detects one or more error conditions, at least one of which can result from more than one cause, and reports the identity and number of the detected errors to at least one error monitor station which accumulates weighted error counts for at least some of the reporting stations, a method for adjusting the weighted errors as a function of a cause of the at least one error having more than one cause comprising the steps at the error monitor station of:

storing a first limit and a plurality of scalar factors, one for each of the error conditions reported by the stations;

counting the number of stations within a predetermined time period reporting errors related to an error condition which can have more than one cause;

recording the largest reported error count which can have more than one cause;

comparing said reporting station count to said limit;

generating a correction factor when the count exceeds the limit by combining the largest reported error count and the scalar factor related to the error; and applying the correction factor to the weighted error for each reporting station for which weighted error counts are maintained.

2. The method set forth in claim 1 in which the count of the number of stations reporting errors related to an error condition which can have more than one cause is not allowed to exceed said first limit plus one.

3. The method set forth in claim 1 in which the number of errors related to an error condition which can have more than one cause is limited to not exceed a predetermined value.

4. The method set forth in any one of claims 1-3 in which the correction factor is the product of the largest reported error and the scalar factor and the correction factor is used to reduce the weighted error for all reporting stations for which weighted errors are maintained.

5. In a communication network including a plurality of data terminals, each of which detects one or more error conditions, at least one of which can result from more than one cause, and reports the identity and number of the detected errors to at least one error monitor station which accumulates weighted error counts for at least some of the reporting stations, a method of adjusting the weighted errors as a function of a cause of the at least one error having more than one cause comprising the steps at the error station of:

examining each of the received error reports during a time period to determine if it includes error counts which can result from more than one cause and pre-filtering the error count related thereto;

weighting and summing the pre-filtered and unfiltered errors;

counting the number of stations reporting an error which can result from more than one cause; and at the expiration of the said time period, filtering the weighted errors of the reporting stations when the count of stations reporting an error which can result from more than one cause exceeds a predetermined value.

6. The method set forth in claim 5 in which the filtering step includes modification of the weighted errors as a function of the maximum number of errors which can result from more than one cause reported by any station.

7. The method set forth in claim 6 in which the maximum number of errors is not allowed to exceed a predetermined value and is multiplied by a predetermined scalar and then subtracted from the weighted error counts.

* * * * *